US012692005B2

(12) United States Patent (10) Patent No.: US 12,692,005 B2

Fagan et al. (45) Date of Patent: Jul. 28, 2026

(54) INTEGRATED SIDE LEDGE FOR AN AIRCRAFT HAVING A WORKING SURFACE SUPPORTED BY A FIRST GEAR RACK AND SECOND GEAR RACK

(71) Applicant: Textron Aviation Inc., Wichita, KS (US)

(72) Inventors: Stephen Howard Fagan, Wichita, KS (US); Paul Stokholm Warren, Valley Center, KS (US); Edward Francis Funke, Cheney, KS (US)

(73) Assignee: Textron Innovations Inc., Providence, RI (US)

( * ) Notice: Subject to any disclaimer, the term of this patent is extended or adjusted under 35 U.S.C. 154(b) by 206 days.

(21) Appl. No.: 18/421,693

(22) Filed: Jan. 24, 2024

(65) Prior Publication Data

US 2025/0236395 A1 Jul. 24, 2025

(51) Int. Cl.
B64D 11/06 (2006.01)

(52) U.S. Cl.
CPC ................................ B64D 11/0638 (2014.12)

(58) Field of Classification Search
CPC .......... B64D 11/0638; A47C 7/68; A47C 7/70

USPC ........................................... 297/145, 160, 62
See application file for complete search history.

(56) References Cited

U.S. PATENT DOCUMENTS

| | | | |
|---|---|---|---|
| 3,506,304 A * | 4/1970 | Smittle | .............. B64D 11/0646 |
| | | | 297/162 |
| 9,102,410 B2 | 8/2015 | Frost et al. | |
| 9,938,016 B2 | 4/2018 | Hance | |
| 10,343,778 B2 | 7/2019 | Peuziat | |
| 2010/0326333 A1 | 12/2010 | St. Louis | |
| 2011/0084527 A1 * | 4/2011 | Marini | ................. B64D 11/064 |
| | | | 297/354.1 |
| 2012/0133180 A1 | 5/2012 | Moulton et al. | |
| 2017/0021932 A1 | 1/2017 | Marais | |
| 2018/0361898 A1 * | 12/2018 | Davis | ................. B64D 11/0627 |

* cited by examiner

*Primary Examiner* — Arfan Y. Sinaki

(74) *Attorney, Agent, or Firm* — Avek IP, LLC

(57) ABSTRACT

An integrated side ledge table for an aircraft includes a mounting system with panels and brackets which mount directly to an aircraft structure. The panels are arranged to form a pocket which conceals gear racks configured to support a working surface such as a table. The table mounted to a pivot plate which is configured to track along the opposed gear racks and move the table to stowed and deployed positions when the lid, which provides access to the pocket, is opened or closed.

18 Claims, 12 Drawing Sheets

INTEGRATED SIDE LEDGE FOR AN AIRCRAFT HAVING A WORKING SURFACE SUPPORTED BY A FIRST GEAR RACK AND SECOND GEAR RACK

CROSS-REFERENCE TO RELATED APPLICATIONS

None.

BACKGROUND OF THE INVENTION

1. Field

The disclosed embodiments relate generally to the field of aircraft interiors. More specifically, the disclosed embodiments relate to aircraft side ledge tables.

2. Description of the Related Art

It is known for an aircraft to have a retractable support for a table stored and mounted within a sidewall. For example, U.S. Patent Publication No. 2010/0326333 to St. Louis discloses a sliding table mechanism stored in an aircraft sidewall. A spring assist is used to move the table from a stowed position to a use position.

It is also known for an aircraft to have a stowable table which moves in both vertical and horizontal directions. For example, U.S. Patent Publication No. 2012/0133180 to Moulton et al. discloses a mechanism incorporated within an armrest or console that allows a table to be moved from a stowed position to a use position. A lifting mechanism is included with the Moulton arrangement to assist in moving the table from a stowed to a use position.

It is also known for an aircraft to have a stowable table with a support mechanism mounted directly to the aircraft seat. For example, U.S. Patent Publication No. 2017/0021932 to Marais discloses a table which moves in translation and rotation when moved from a stowed to a use configuration. A guide track may be used with Marais to allow the tray table to deploy.

It is also known for an aircraft to have a table able to deploy and retract over a side ledge console. For example, in U.S. Pat. No. 9,938,016 to Hance describes a table mounted over a side ledge console with a cover designed to upwardly close off the housing at the deployment opening in the retracted position of the table. When retracted, the Hance table pushes down an elastic biasing system.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to an integrated side ledge for an aircraft, the integrated side ledge including: a working surface wherein the working surface is supported in between a first gear rack and a second gear rack, the first gear rack and the second gear rack each mounted inside a pocket and on opposing sides; the pocket being mounted onto a mounting bracket wherein the mounting bracket is mountable to aircraft structure; the working surface being configured to move from a stowed position inside the pocket to a fully deployed position when removed from the pocket.

In some embodiments, the techniques described herein relate to an integrated side ledge for an aircraft, the integrated side ledge including: an aircraft structure wherein the aircraft structure is configured to be secured to a mounting system; a pocket including a rear panel wherein the rear panel is configured to be fastened to the mounting system; a working surface wherein the working surface is supported on opposite sides by a first gear rack and a second gear rack and is configured to track in a single plane aligned in the vertical direction. the first gear rack and the second gear rack being mounted to opposing walls forming the pocket.

In some embodiments, the techniques described herein relate to an integrated side ledge for an aircraft, the integrated side ledge including: a table wherein the table is mounted to a pivot plate and the pivot plate is supported on opposing ends by a first gear rack and a second gear rack and is configured to track in between the first and second gear racks; the first gear rack and the second gear rack being mounted to opposing side panels wherein each opposing side panel mounts to a rear panel and the rear panel, opposing side panels, and a front panel are arranged to form a pocket; a mounting system wherein the rear panel mounts directly to the mounting system and the mounting system mounts directly to aircraft structure.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1:
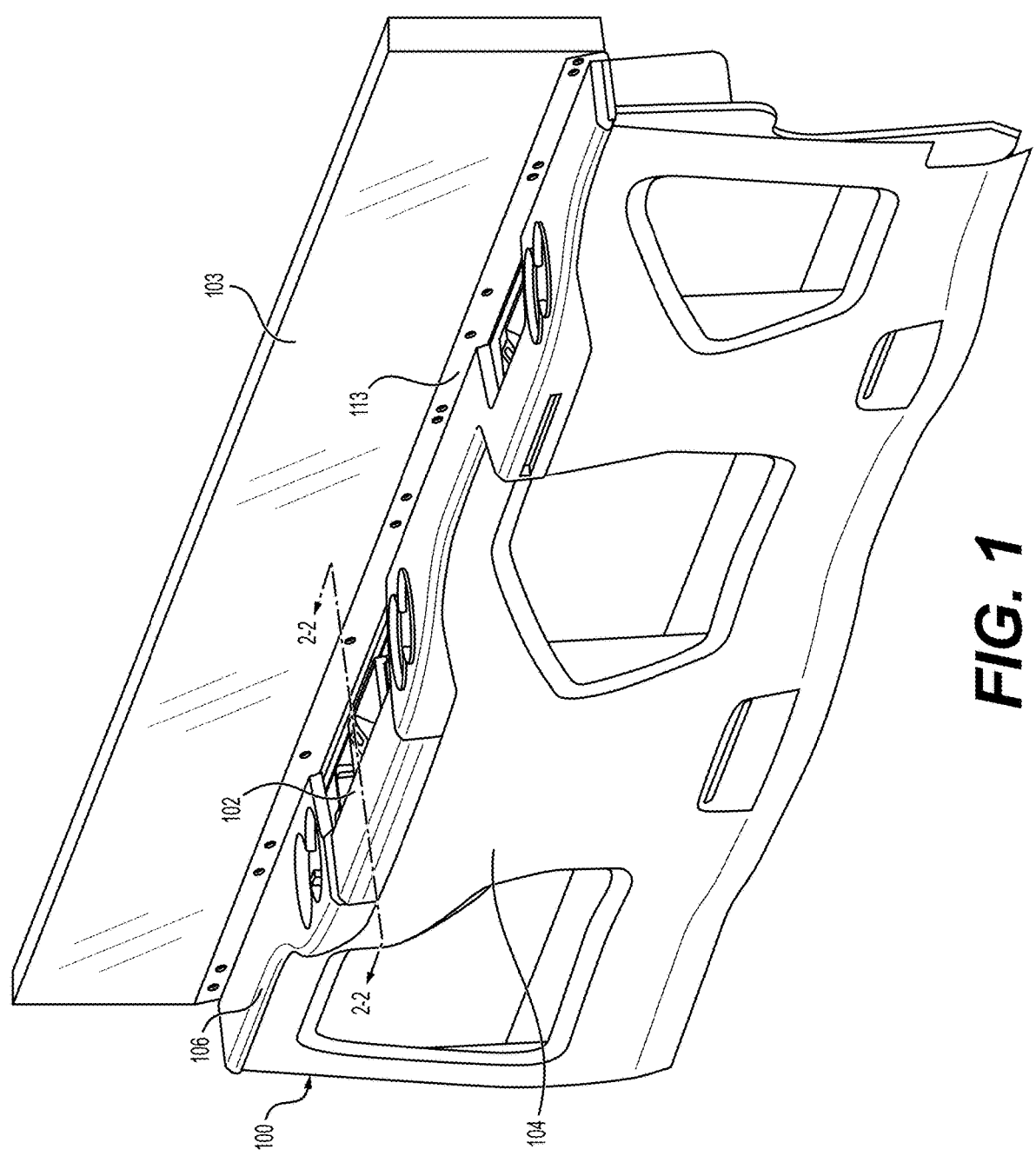
FIG. 1 is a front perspective view of the integrated side ledge for an aircraft.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments disclosed herein provide an arrangement for mounting a table structure and support system for a table to be stowed within an aircraft side ledge. In current arrangements, aircraft side ledges are designed without a table designed to deploy from within the side ledge. This results in tables being developed with their own enclosure and support system. The additional enclosure and support system must be fit within the side ledge and may increase the size of the side ledge. This is disadvantageous because the additional support structure increases weight, part count, and space which make the side ledges larger and heavier. An arrangement is needed which mounts a deployable table directly to a side ledge so that no additional support structure is needed.

Within embodiments an integrated side ledge arrangement allows for a table to be mounted directly to an aircraft side ledge. The table is mounted to a tracking system within the aircraft side ledge which supports the table within the side ledge. The tracking system is mounted directly to the inside of the aircraft side ledge encasement and includes a linearly straight channel in which the table may track upwards and downwards to a stowed and deployed position. The side ledge also includes a lid which may be opened and closed for the table to be stowed and deployed from the aircraft side ledge. The table is able to be folded to be moved to a stowed position within the aircraft side ledge. A stowed position as used in embodiments herein is defined to be the position with the table inside of the integrated side ledge and a deployed position is defined to the table outside of the integrated side ledge.

Figure 2:
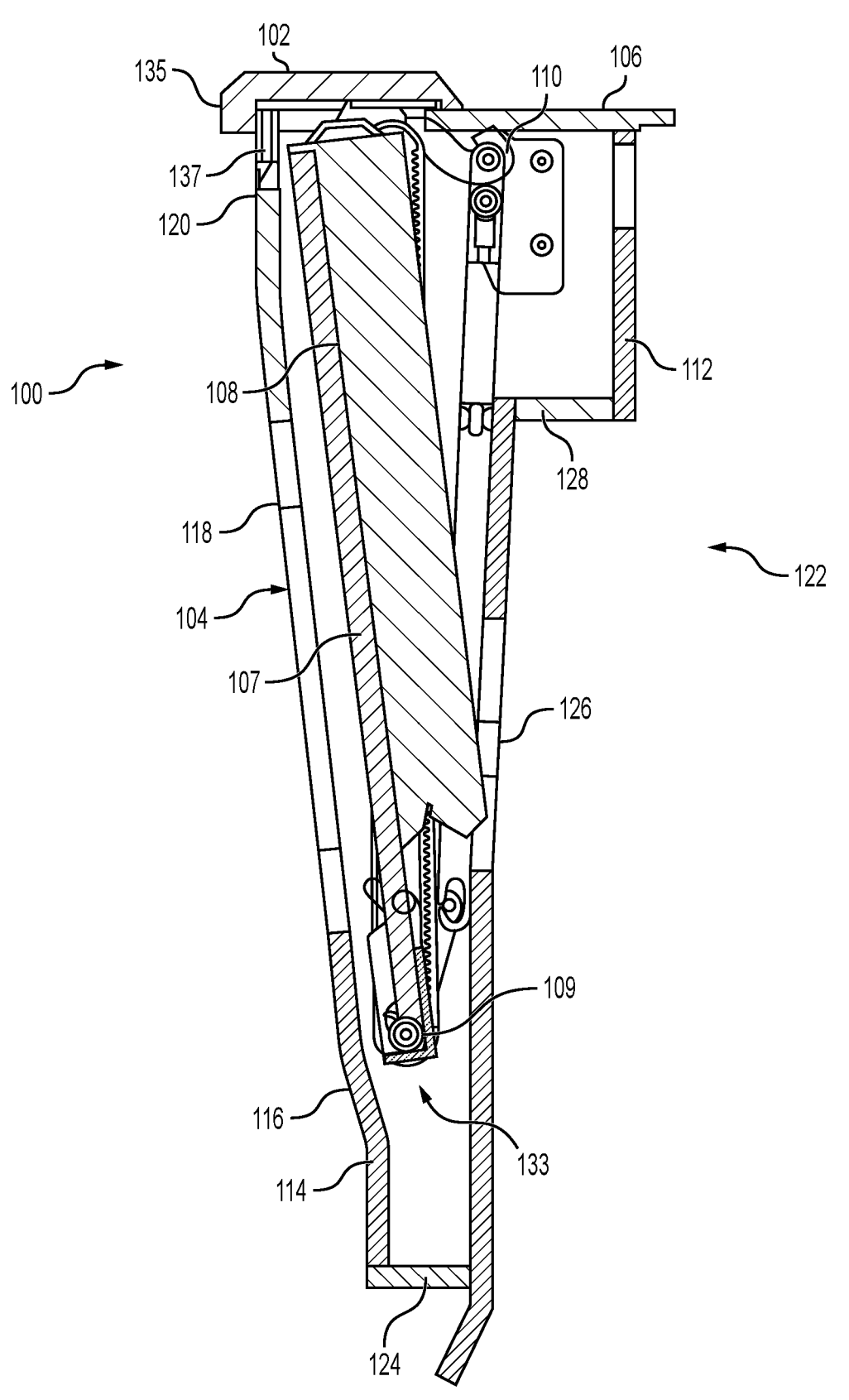
FIG. 2 is a cross sectional view of the integrated side ledge for an aircraft of FIG. 1.

Shown in a perspective view in FIG. 1 an aircraft integrated side ledge 100 is shown in an embodiment. The integrated side ledge 100 includes a front panel 104 and a lid 102 configured on a top panel 106. The top panel 106 creates a top surface for the integrated side ledge 100 which spans around the lid 102 and from the front panel 104 to a back panel 122 (FIG. 2). The front panel 104 is positioned substantially below the lid 102 and protrudes outwards from the integrated side ledge 100. The upper mounting bracket 113 is configured along the back facing surface of the integrated side ledge 100. The upper mounting bracket 113 includes a plurality of upper mounting holes 115. Sixteen mounting holes 115 are shown in embodiments to be configured across the upper mounting bracket 113 with inconsistent spacing, which may be strategic, such that fastening devices such as bolts or screws may be inserted through the upper mounting holes 115 to substantially secure the integrated side ledge 100 directly to the aircraft structure 103.

FIG. 2 shows a cross sectional view taken along the line 2-2 in FIG. 1 of the integrated side ledge 100. The front panel 104 extends upward from an outwardly extending floor member 124, and rises directly upward to form a substantially vertical bottom front member 114, above that juts abruptly outward (where the internal table delivery mechanics begin) at angled front wall portion 116, then rises at a less pronounced angle to form an intermediate front wall portion 118, and then returns to vertical at an upper front wall portion 120 which rises up to meet the lid 102. This overall configuration forms a pocket 133 with the back panel 122 and allows for the bottom region of the front panel 104 to be substantially flush with the floor member 124 of the integrated side ledge 100, while the uppermost portion protrudes and is extended away from the rest of the integrated side ledge 100 structure. As the front panel 104 rises upwards the front panel 104 protrudes at an increasing distance away from the back panel 122 of the integrated side ledge 100 such that the front panel 104 is outwardly angled relative to the back panel 122.

Figure 5:
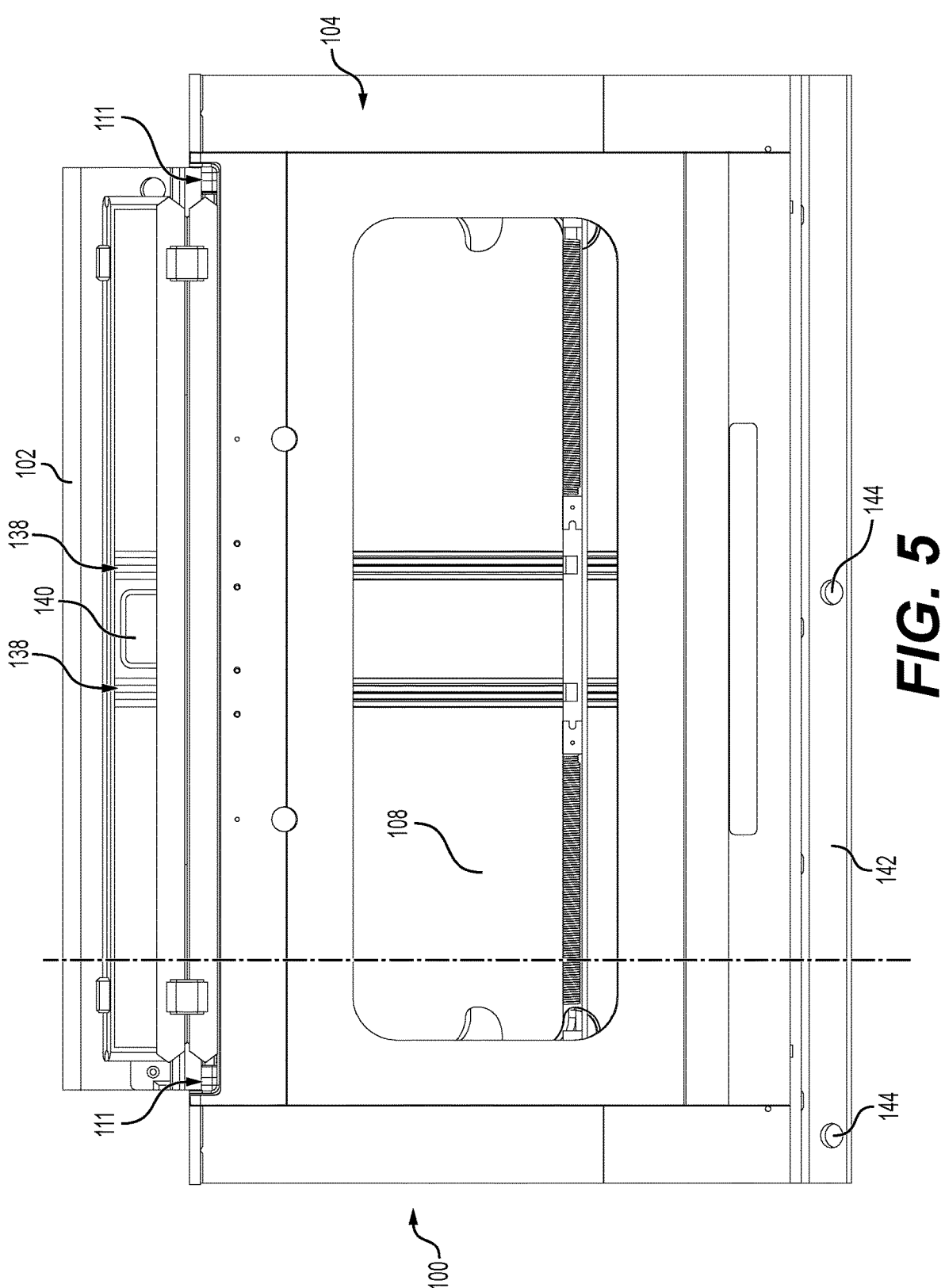
FIG. 5 is a front view of the integrated side ledge for an aircraft of FIG. 1.
Figure 11:
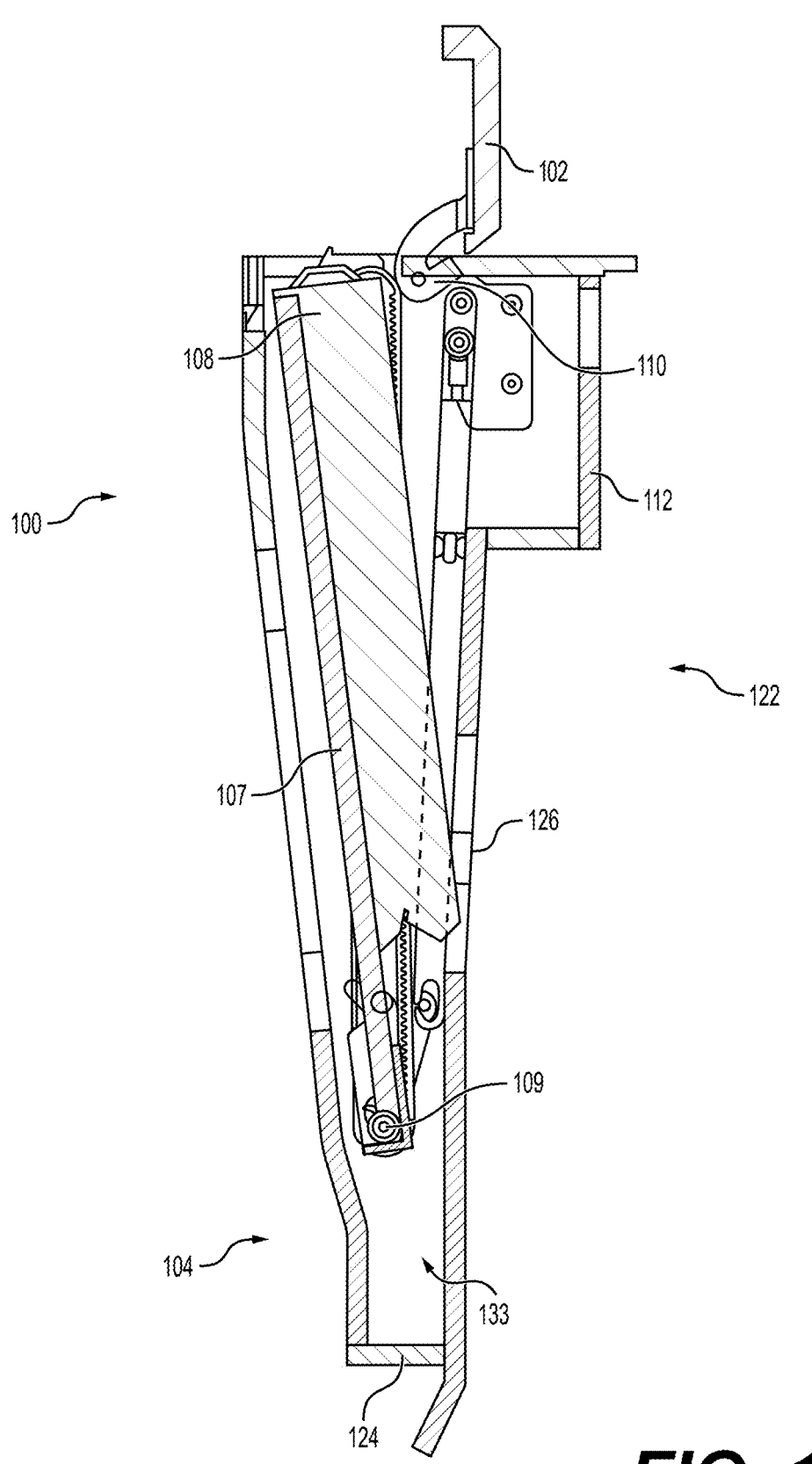
FIG. 11 is a cross-sectional view of the integrated side ledge for an aircraft of FIG. 1 with a lid in an open position.
Figure 12:
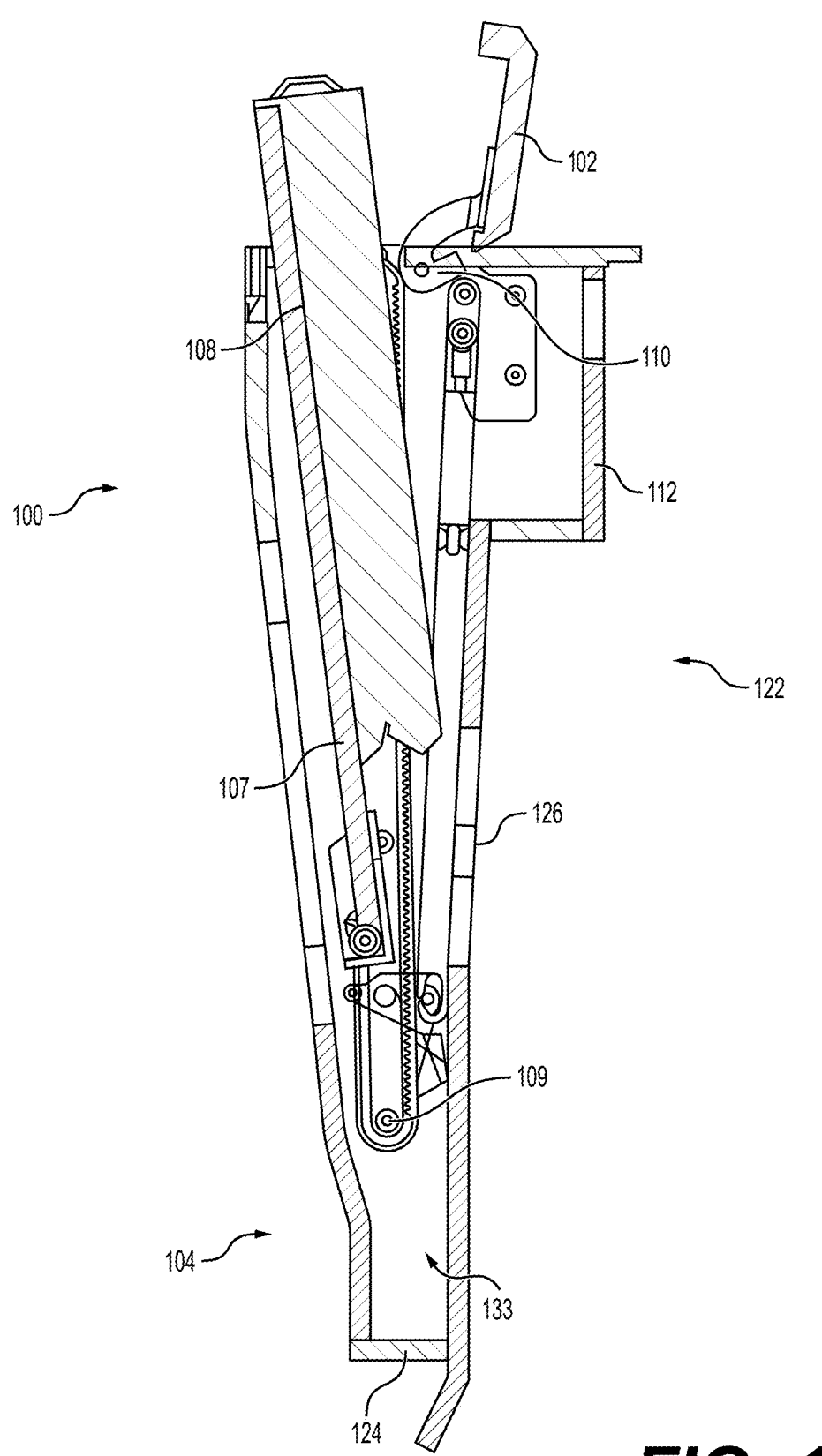
FIG. 12 is a cross-sectional view of the integrated side ledge for an aircraft of FIG. 1 with the lid of FIG. 11 in a past open position.

The lid 102, which is hingedly mounted to the top panel 106, is above the uppermost and most protruded portion of the front panel 104 (i.e., the upper front wall portion 120). The overall configuration of the front panel 104 which protrudes outward from the back panel 122 forms a pocket 133, which allows for a working surface such as a table 108 (FIG. 2) to be stowed and concealed within the integrated side ledge 100. The table 108 may be deployed when the lid 102 is opened or pivoted to a past open position (see FIG. 12) by a user. As shown in FIG. 11, the lid is in the open position and, as shown in FIG. 12, the past open position is a position in which the lid 102 is rotated more than or past the open position shown in FIG. 11. A downwardly curved forward edge 135 of the lid 102 drapes over the guide rails 137 of the upper front wall portion 120 of the front panel 104 such that guide rails 137 support the lid 102 from below when the lid 102 is closed. The guide rails 137 may be fabricated from metal or a similar material and provides support for the table 108 when the table 108 is in a deployed position. Two guide rails 137 may be configured on an upper edge of the upper front wall portion 120 and may be sized and positioned to fit within a groove 138 configured on the underside of the table 108 (FIG. 5). In embodiments and with reference to FIG. 9, the guide rails 137 are oriented to run vertically within the pocket 133 in a single plane such that the grooves 138 configured on the underside of the table 108 and the pivot plate 107 track along the guide rails 137 and support the table 108 when it is moved to stowed and deployed positions. The guide rails 137 are mounted to hinges 152 positioned on the underside of the pivot plate 107. The hinges 152 allow the pivot plate 107 and table 108 to pivot once removed from the pocket 133. When in a stowed position the hinges 152 substantially align with the guide rails 137 such that the table 108 may be supported while being tracked along the linear gear racks 111.

The top panel 106 of the side ledge may include amenities such as wireless chargers and cupholders positioned near the lid 102, as shown in embodiments. The type, function, or location of the amenities should not be considered limiting within the scope of this application unless so claimed, and the details regarding these features are not described in depth in embodiments herein.

Figure 3:
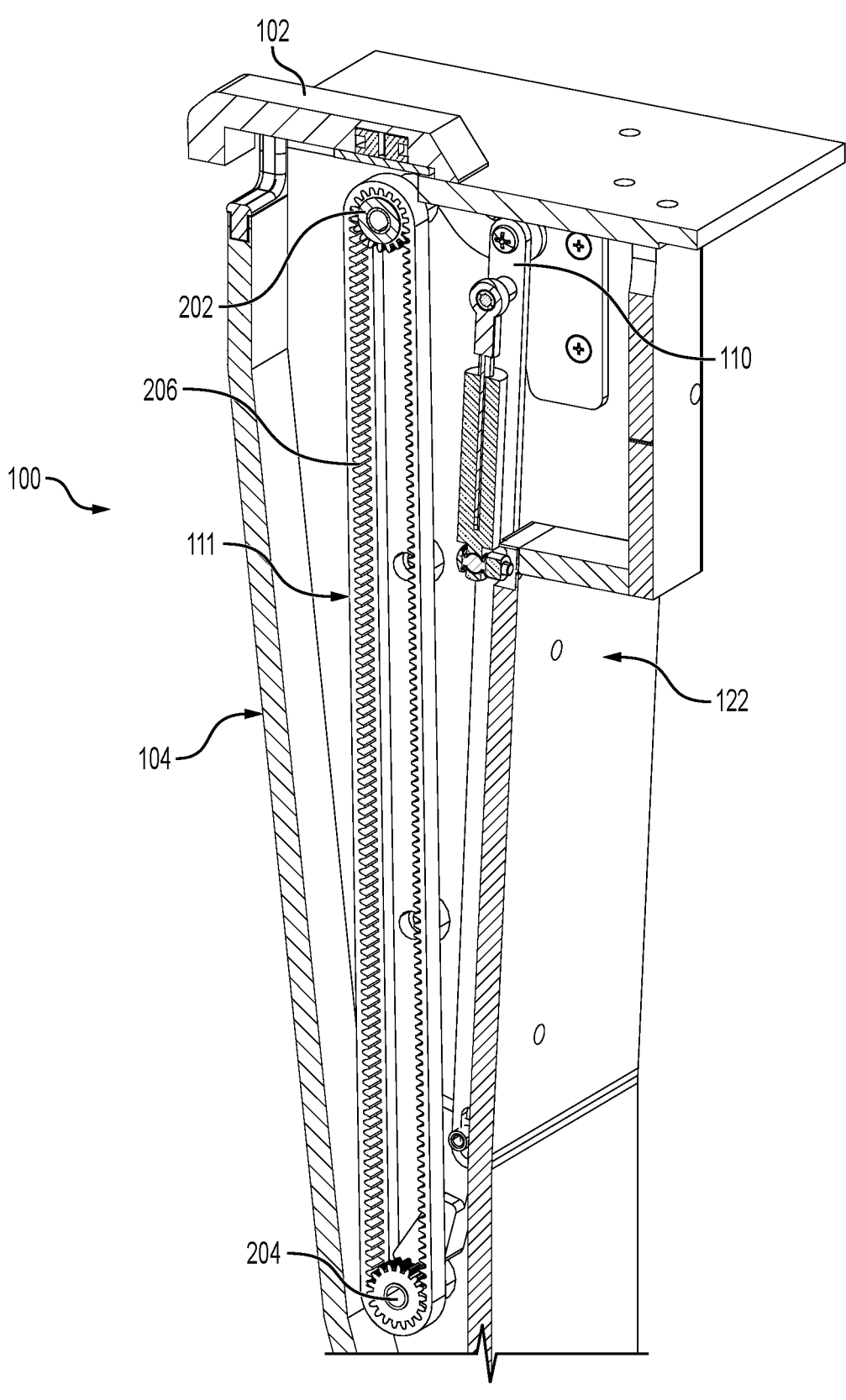
FIG. 3 is a cross sectional view of the integrated side ledge for an aircraft with the table removed, wherein the sectional is taken at an angle to provide perspective.

FIG. 2 reveals the table 108 stowed and concealed in the pocket/chamber 133 within the integrated side ledge 100 with the lid 102 in a closed position. The chamber or pocket 133 is defined by the interior surfaces of the front and back panels 104 and 122. The front panel 104 and the back panel 122 are connected or integrated together by their bottom-most members (i.e., bottom front vertical member 114 and the lower member 126) by the floor member 124. The front panel 104 and back panel 122 are not connected on their uppermost members (i.e., upper front wall portion 120 and top rear vertical member 112) with the top panel 106 extending laterally from the top rear vertical member 112 and creating an opening into the pocket 133 which is covered by the lid 102. In embodiments, the front panel 104 is shown to include a bottom front vertical member 114 connecting to the angled front wall portion 116 leading to the intermediate front wall portion 118 continuing to an upper front wall portion 120. Opposite the front panel 104, the back panel 122 beginning from the floor member 124 includes a lower rear member 126 which is joined to a lateral rear extending member 128 which connects to the top rear vertical member 112. The lower rear member 126 includes a slight bend away from the front panel 104. The front panel 104 is configured with angled members 116 and 118 to extend away from the back panel 122 which increases the distance between the front panel 104 and the back panel 122 as both panels 104 and 122 flow upwards, which increases the size of the inner chamber or pocket 133 of the integrated side ledge 100. Within the inner pocket 133 of the integrated side ledge 100, the table 108 in FIG. 2 is shown to be mounted to a pivot plate 107. The pivot plate 107 includes pivot mounts 109 on each side edge which are each able to track within a linear gear rack 111 (FIG. 3). The pivot plate 107 allows the table 108 to be moved to a deployed and stowed position while being substantially mounted to the integrated side ledge 100.

Figure 9:
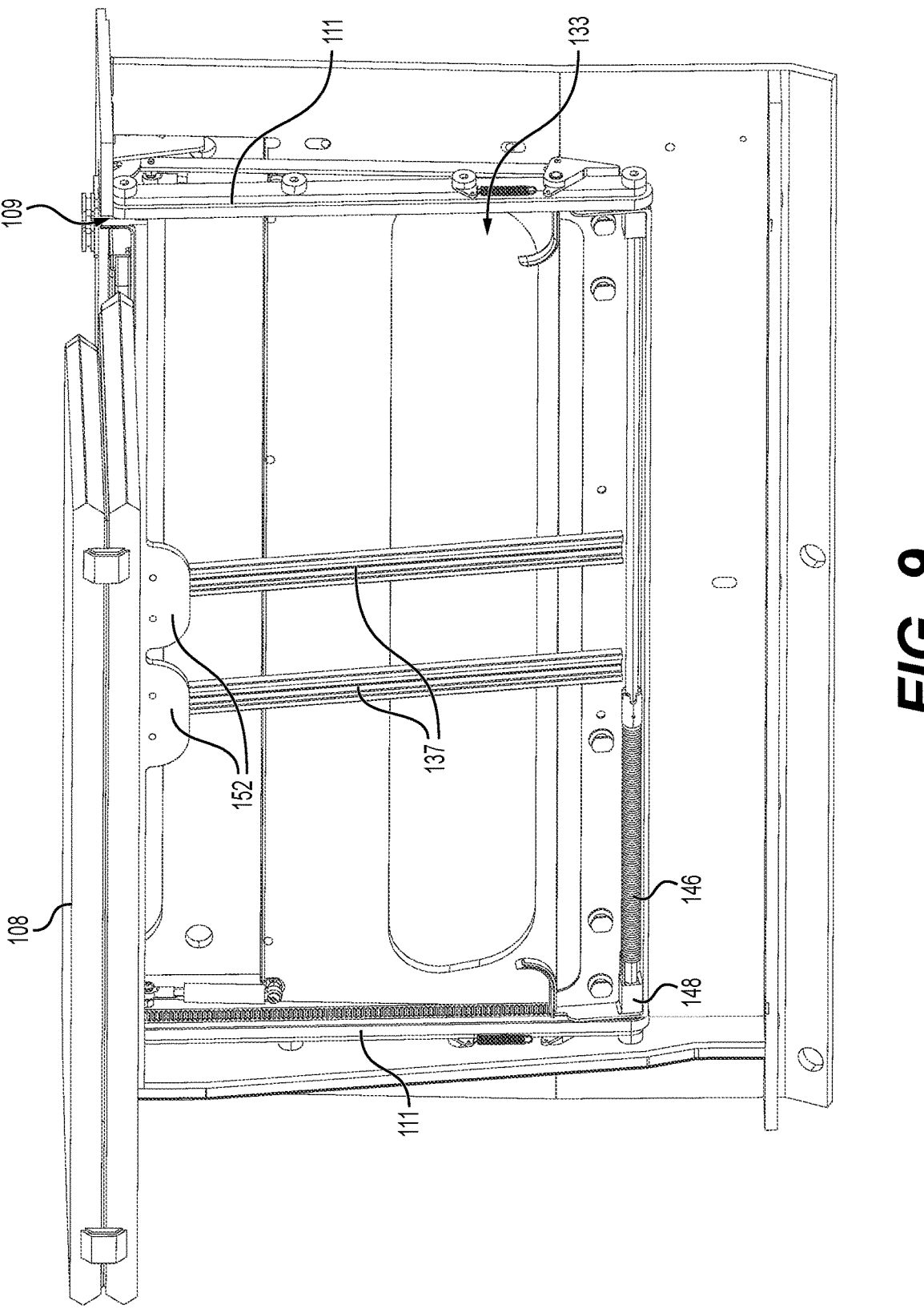
FIG. 9 is a front partially internal view of the integrated side ledge with the front panel removed.
Figure 10:
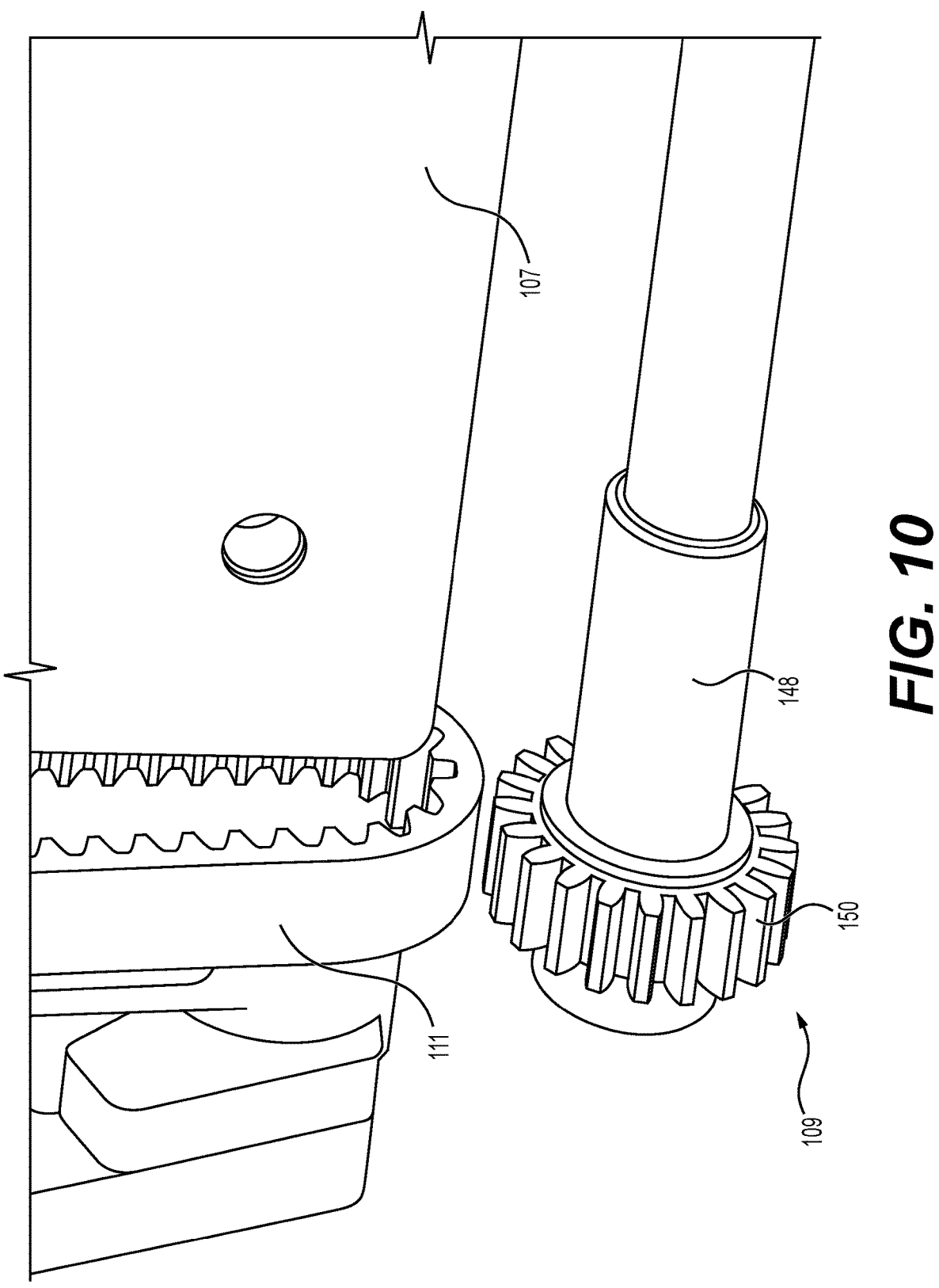
FIG. 10 is a close-up view of a pivot mount removed from a linear gear rack of the integrated side ledge.

FIG. 10 shows a close-up view of one pivot mount 109 removed from the linear gear rack 111. In embodiments, the pivot mount 109 includes a gear 150 configured with a bearing 148 which enables the pivot plate 107 to track with the gear 150 as the gear 150 tracks in each linear gear rack 111. FIG. 9 shows the bearing 148 adjacent to a torsion spring 146 which may be used to drive the pivot plate 107 and table 108 out of the pocket 133.

Figure 6:
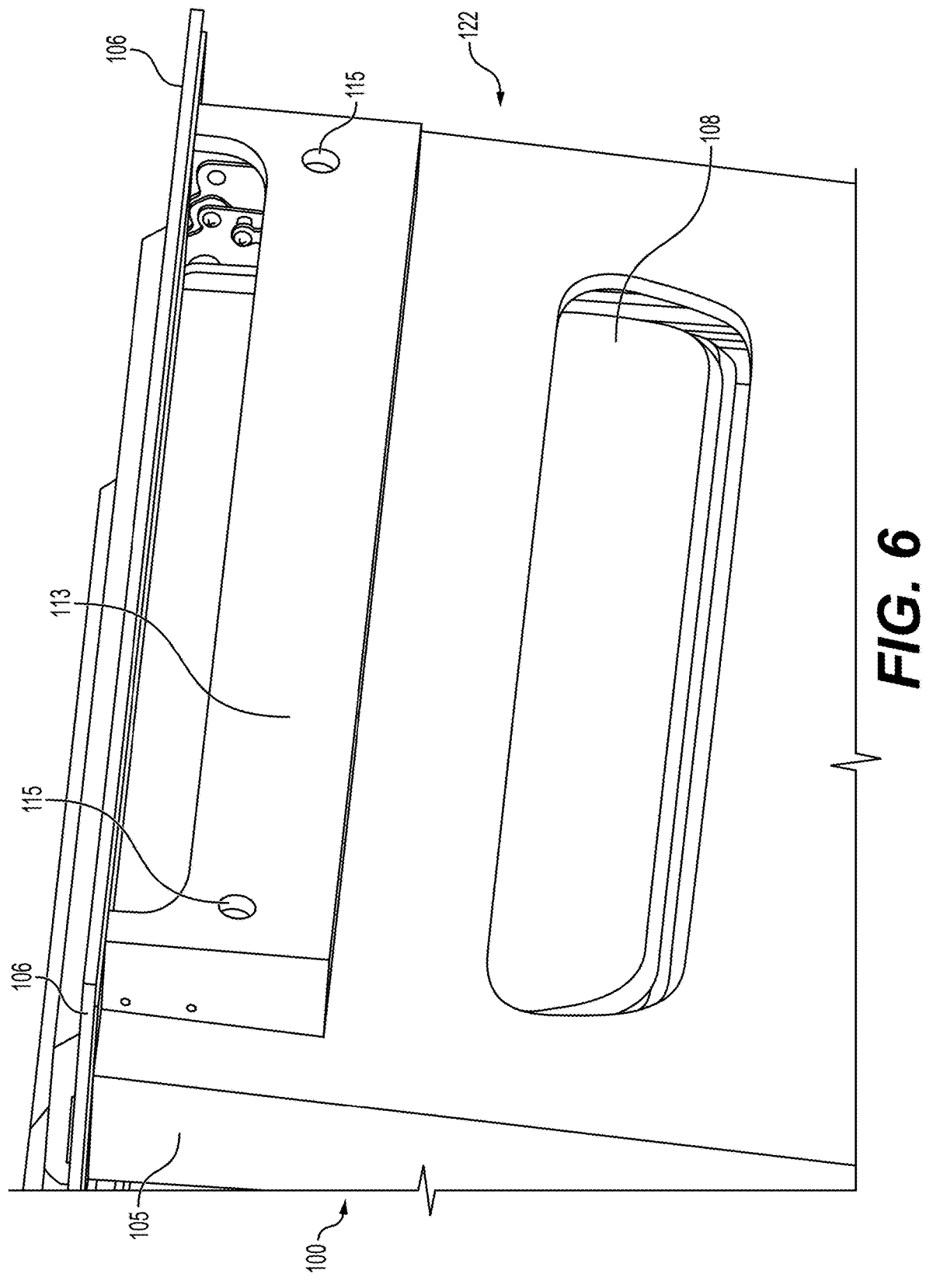
FIG. 6 is a rear perspective partially internal view of the integrated side ledge for an aircraft of FIG. 1.
Figure 7:
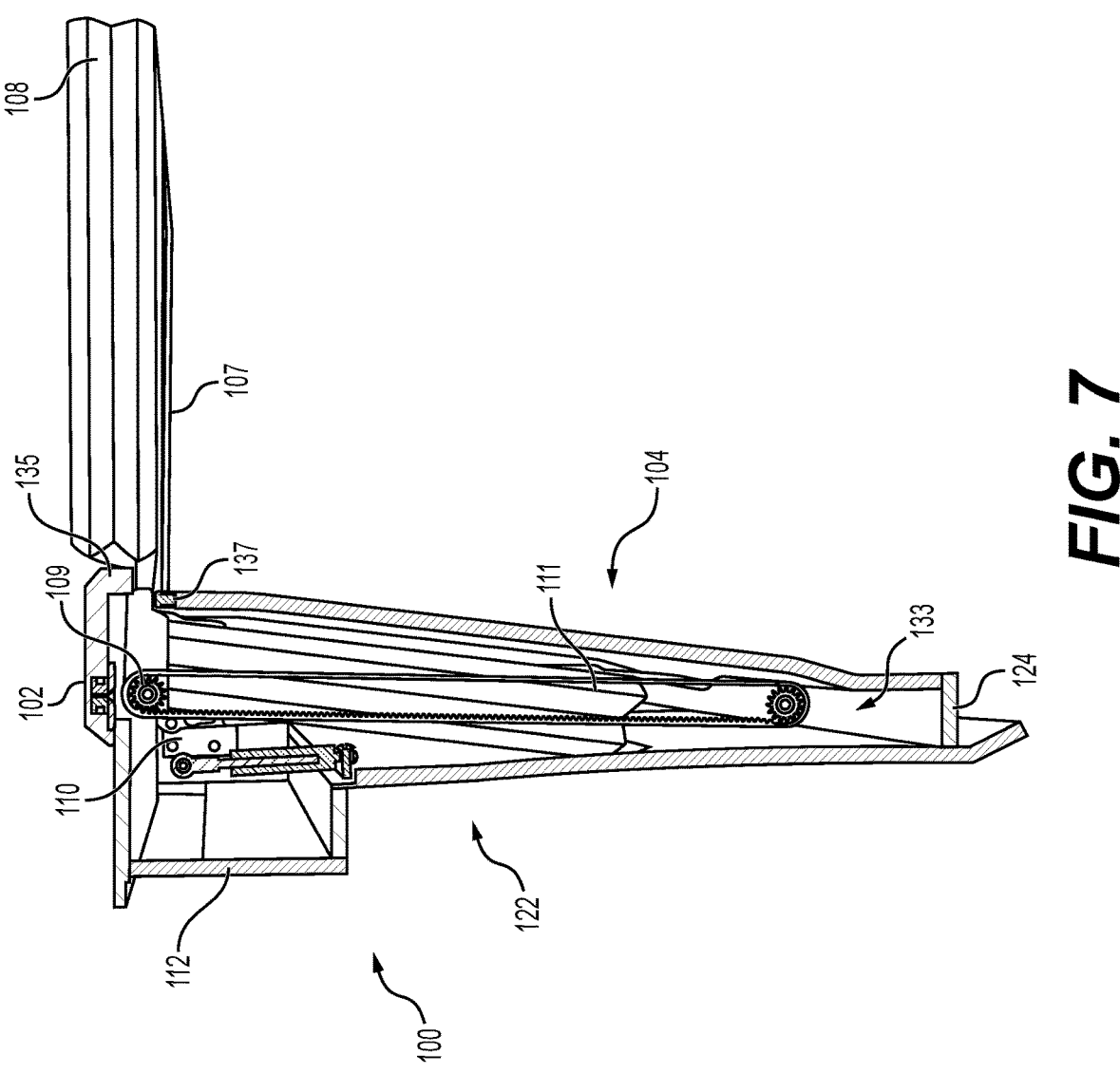
FIG. 7 is a cross sectional view of the integrated side ledge opposite of the view shown in FIG. 2.

FIG. 7 is a cross sectional view taken along the line 2-2 revealing the opposite side of the integrated side ledge 100. The components and arrangements described in embodiments and shown in FIGS. 1-6 are included in similar configurations to the ones shown in FIG. 7. The pivot mount 109 is positioned opposite from the pivot mount 109 on the opposing side of the table 108 which may be seen in FIG. 2.

Figure 8:
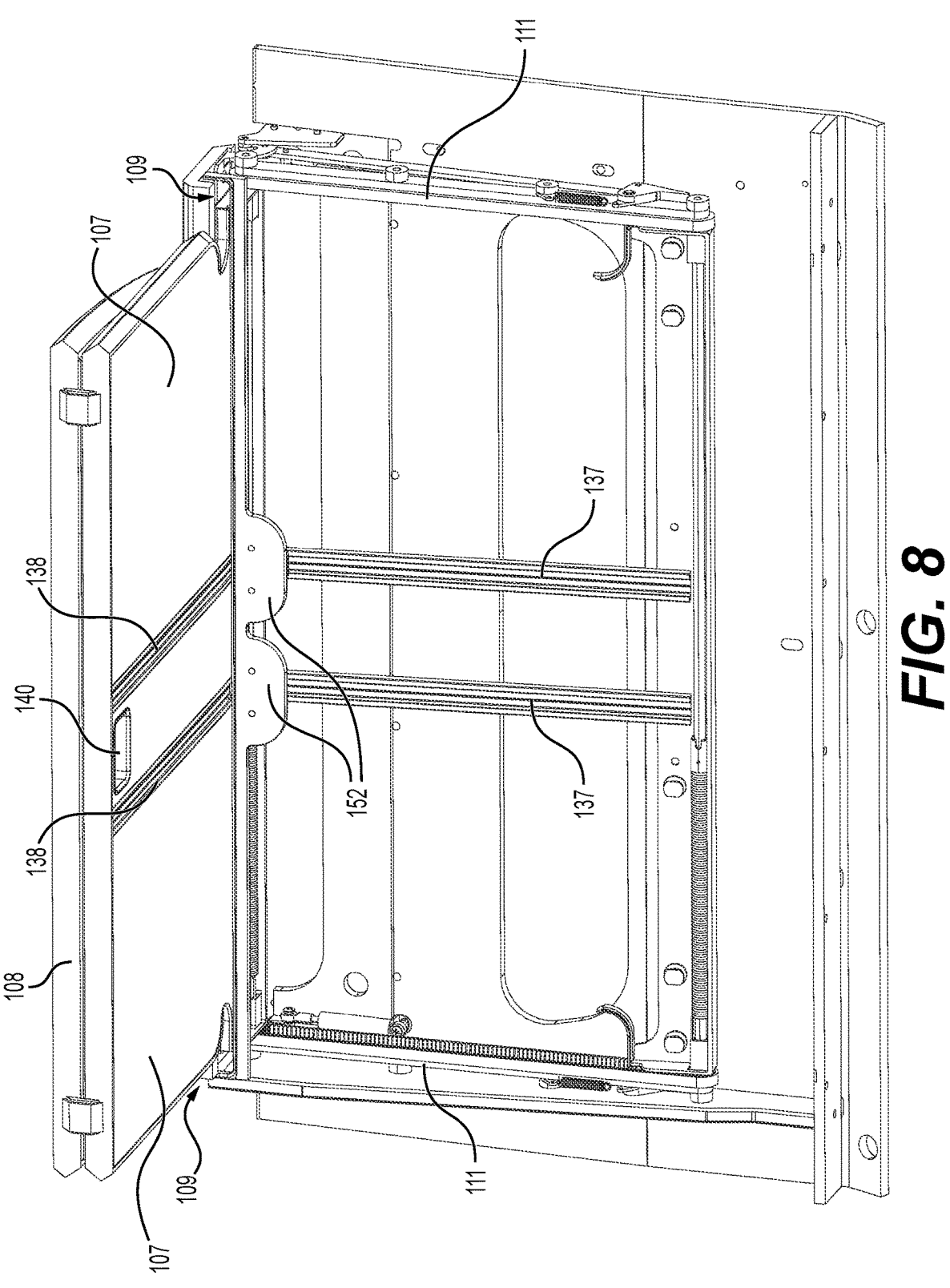
FIG. 8 is close-up partially internal view of the integrated side ledge with a front panel removed.

FIG. 8 shows an underneath perspective view of the integrated side ledge 100 with the front panel 104 and the side panel 105 removed to reveal the pocket 133. The pivot plate 107 is mounted to the underside of the table 108 such that the pivot mounts 109 on the outer sides of the pivot plate 107 engage with the linear gear racks 111 positioned on each end of the pocket 133. In this way, the table 108 is supported by being mounted to the pivot plate 107 positioned in between the opposing linear gear racks 111 configured on either side of the table 108.

FIG. 3 shows a cross sectional side view of the integrated side ledge 100 at a slightly offset angle with the table removed for the sake of clarity. The linear gear rack 111 is substantially vertically extending from the top to the bottom of the inner pocket 133 of the integrated side ledge 100. The linear gear rack 111 is mounted on the inner face of each side panel 105 on opposing ends of the pocket 133 and is aligned in the vertical direction in a single plane. The substantially linear gear rack 111 includes an upper rotating member 202 and a lower rotating member 204 each positioned within the linear gear rack 111 and wrapped over with siding 206. In embodiments the upper rotating member 202 and the lower rotating member 204 may be gears including teeth. The siding 206 wraps around to contain the upper rotating member 202 and lower rotating member 204 and forms the sides of the linear gear rack 111. The siding 206 surfaces shown in embodiments are smooth and have notches or gear teeth on their surface sized and configured to interact with both the upper rotating member 202 and the lower rotating member 204. The linear gear rack 111 is mounted directly inside the front and back panels 104 and 122 of the side ledge 100. The linear gear rack 111 allows the pivot mount 109 to track within the siding 206. The pivot mount 109 is mounted to each side of the pivot plate 107 which is mounted to the table 108 allowing the table 108 to be fully contained by the integrated side ledge 100 when stowed, and fully supported by the by the side ledge 100 when deployed. The lid 102 is mounted directly to the integrated side ledge 100 with the lid hinge mount 110.

Figure 4:
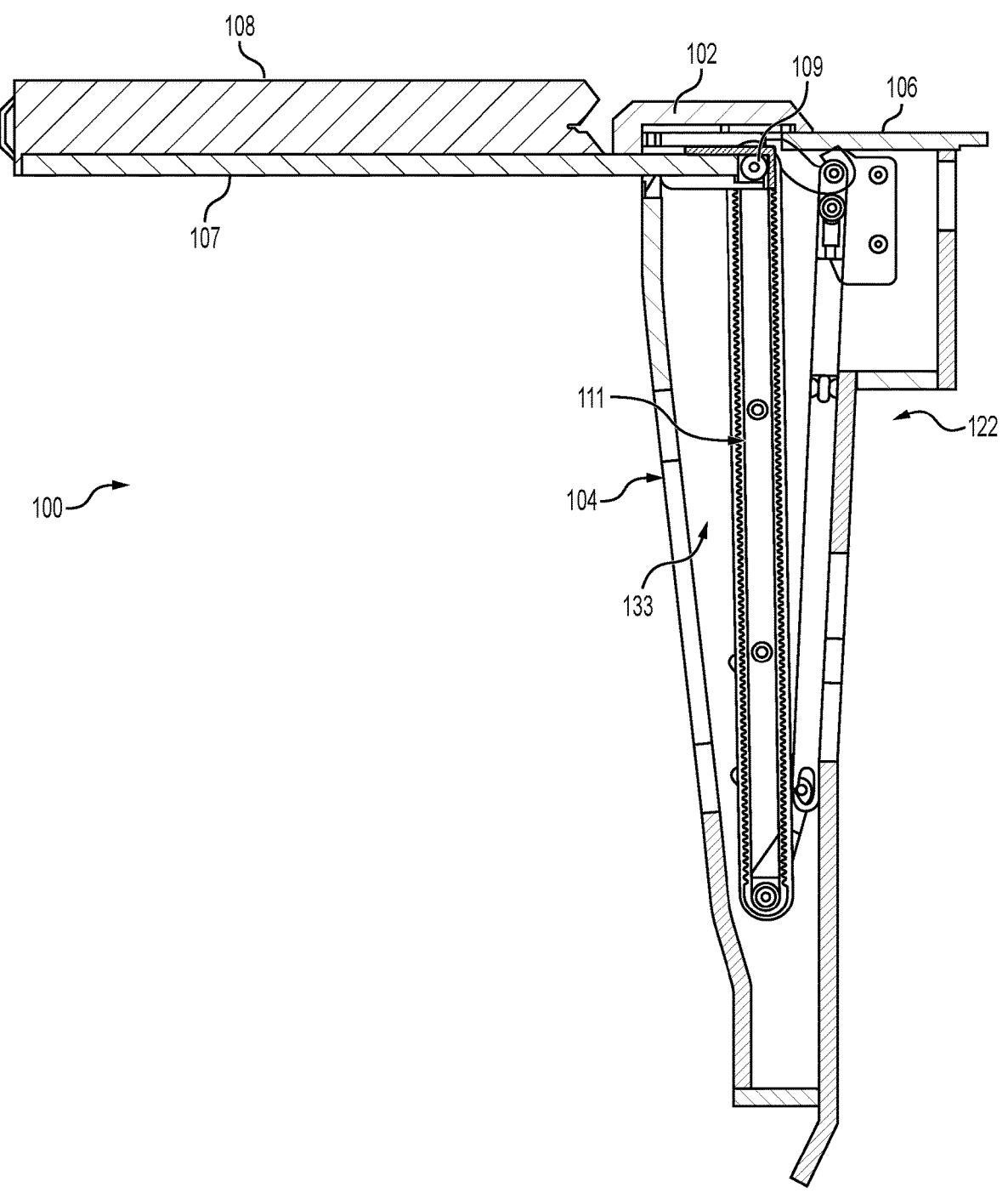
FIG. 4 is a cross sectional view of the integrated side ledge for an aircraft with the table deployed.

Shown in FIG. 4 in a cross-sectional view taken along the line 2-2 in FIG. 1, the table 108 is removed from the inner cavity or the pocket 133 of the integrated side ledge 100. The table 108 is supported in the deployed position shown as the linear gear rack 111 supports the pivot mounts 109 configured with the pivot plate 107 mounted to the underside of the table 108. The linear gear rack 111 and its components are directly mounted to the integrated side ledge 100 allowing the table 108 to be directly mounted to the integrated side ledge 100. The pivot mount 109 and the guide rails 137 provide support when the table 108 is moved to a deployed position.

Shown in FIG. 5, in a front partially internal view, the integrated side ledge 100 is shown with the lid 102 in an open position and the table 108 in a stowed position. The linear gear rack 111 is positioned within the internal cavity of the integrated side ledge 100 near each interior edge so that the pivot mount 109 and pivot plate 107 may support the table on both sides and track the table 108 to deployed and stowed positions. The underside of the table 108 and pivot plate 107 includes grooves 138. The grooves 138 are linear and span longitudinally on the underside surface of table 108. The grooves 138 are sized and positioned to allow for the guide rails 137 (FIG. 2) to slide within each groove 138 and allow the table 108 to slide and move to deployed and stowed positions. The table 108 includes a pull point 140. The pull point 140 may be an aperture or cutout on the underside surface of the table 108 and in embodiments, is positioned in between each groove 138. The pull point 140 is recessed to allow for a user to insert a finger or fingers to pull the table 108 out from the integrated side ledge 100. A lower mounting bracket 142 is configured on the bottom edge of the rear facing surface of the integrated side ledge 100. The lower mounting bracket 142 includes a plurality of lower mounting holes 144 which are configured to allow for a fastening device such as a bolt or screw to insert and secure the integrated side ledge 100 directly to the aircraft side ledge. In embodiments, two lower mounting holes 144 are shown.

FIG. 6 shows a partially internal rear perspective view of the integrated side ledge 100 of FIG. 1. The table 108, in the figure, is in a stowed position and shown internally within the integrated side ledge 100. The table 108 is mounted to the linear gear rack 111 which supports the table 108 while in a stowed position within the inner cavity of the integrated side ledge 100. The top panel 106 is shown on both sides of the back panel 122 and the side panel 105 extends downwards to the outwardly extending floor member 124 to fully enclose the pocket 133 of the integrated side ledge 100. The upper mounting holes 115 are shown on the back panel 122 which mounts to the upper mounting bracket 113 which is configured to be mounted directly to the aircraft side ledge.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. An integrated side ledge for an aircraft, the integrated side ledge comprising:
   a working surface, wherein the working surface is supported in between a first gear rack and a second gear rack, the first gear rack and the second gear rack each mounted inside a pocket and on opposing sides;
   the pocket being mounted onto a mounting bracket, wherein the mounting bracket is mountable to an aircraft structure;
   a pivot plate mounted to an underneath surface of the working surface and includes a first pivot mount on one side edge and a second pivot mount on an opposite side edge;
   the working surface being configured to move from a stowed position inside the pocket to a fully deployed position when removed from the pocket.

2. The integrated side ledge of claim 1, wherein the first pivot mount is configured to track along the first gear rack and the second pivot mount is configured to track along the second gear rack.

3. The integrated side ledge of claim 1, wherein the pocket includes a front panel, a back panel, a first side panel, a second side panel, and a top panel wherein a lid hingedly mounts to the integrated side ledge.

4. The integrated side ledge of claim 3, wherein the first gear rack fastens to the first side panel and the second gear rack fastens to the second side panel.

5. The integrated side ledge of claim 3, wherein the lid pivots such that the working surface moves between the stowed position and the fully deployed position.

6. The integrated side ledge of claim 1, wherein the pocket conceals the working surface when the working surface is in the stowed position.

7. An integrated side ledge for an aircraft, the integrated side ledge comprising:
   mounting system, wherein the mounting system is configured to be secured to an aircraft structure;
   a pocket including a rear panel, wherein the rear panel is configured to be fastened to the mounting system;
   a working surface, wherein the working surface is supported on opposite sides by a first gear rack and a second gear rack and is configured to track in a single plane aligned with the first gear rack and the second gear rack;
   the first gear rack and the second gear rack being mounted to opposing walls forming the pocket; and
   a pivot plate mounted to an underside of the working surface.

8. The integrated side ledge of claim 7, wherein the first and second gear racks include siding, wherein the siding wraps around an upper rotating member and a lower rotating member forming the sides of a channel.

9. The integrated side ledge of claim 8, wherein the siding includes gear teeth, wherein the gear teeth interact with gear teeth configured on the upper rotating member and lower rotating member.

10. The integrated side ledge of claim 7, wherein the pivot plate includes pivot mounts positioned on opposing outer edges configured to track in between the siding of the first gear rack and the second gear rack.

11. The integrated side ledge of claim 10, wherein the pivot mounts each include gear teeth configured to interact with the siding to allow the working surface to be tracked.

12. The integrated side ledge of claim 7, further comprising a lid hingedly mounted to a top panel to provide access to the pocket when the lid is pivoted to an open position.

13. The integrated side ledge of claim 12, wherein pivoting the lid to a past open position deploys the working surface from the pocket.

14. The integrated side ledge of claim 12, wherein the working surface includes at least one groove configured to track along at least one guide rail.

15. The integrated side ledge of claim 14, wherein the guide rail is aligned in a single plane in a vertical direction within the pocket.

16. The integrated side ledge of claim 14, wherein the guide rail includes an upper edge configured to support the working surface in a deployed position.

17. The integrated side ledge of claim 7, wherein the opposing walls are each mounted to opposing ends of the rear panel.

18. An integrated side ledge for an aircraft, the integrated side ledge comprising:
   a table, wherein the table is mounted to a pivot plate and the pivot plate is supported on opposing ends by a first gear rack and a second gear rack and is configured to track in between the first and second gear racks;
   the first gear rack and the second gear rack being mounted to opposing side panels, wherein each opposing side panel mounts to a rear panel, wherein the rear panel, the opposing side panels, and a front panel are arranged to form a pocket;
   a mounting system, wherein the rear panel mounts directly to the mounting system and the mounting system mounts directly to an aircraft structure.

* * * * *